(No Model.)

W. R. BOWEN.
HAND SEED SOWER.

No. 525,942.        Patented Sept. 11, 1894.

WITNESSES:
Fred G. Dieterich
P. B. Turpin

INVENTOR
William R. Bowen.
BY Munn & Co
ATTORNEYS.

UNITED STATES PATENT OFFICE.

WILLIAM REECE BOWEN, OF CLAYTON, FLORIDA.

HAND SEED-SOWER.

SPECIFICATION forming part of Letters Patent No. 525,942, dated September 11, 1894.

Application filed February 9, 1894. Serial No. 499,581. (No model.)

*To all whom it may concern:*

Be it known that I, WILLIAM REECE BOWEN, of Clayton, in the county of Putnam and State of Florida, have invented a new and useful Improvement in Hand Seed-Sowers, of which the following is a specification.

My invention is an improvement in hand sowers and has for an object to provide a simple inexpensive device which may be conveniently carried in the hand and which is constructed to properly sow any one of the ordinary garden seed and also to sow broadcast certain small seeds, fertilizers, insecticides, &c., as will be more fully described.

The invention consists in the novel constructions, combinations and arrangements of parts, as will be hereinafter described and pointed out in the claims.

Figure 1:
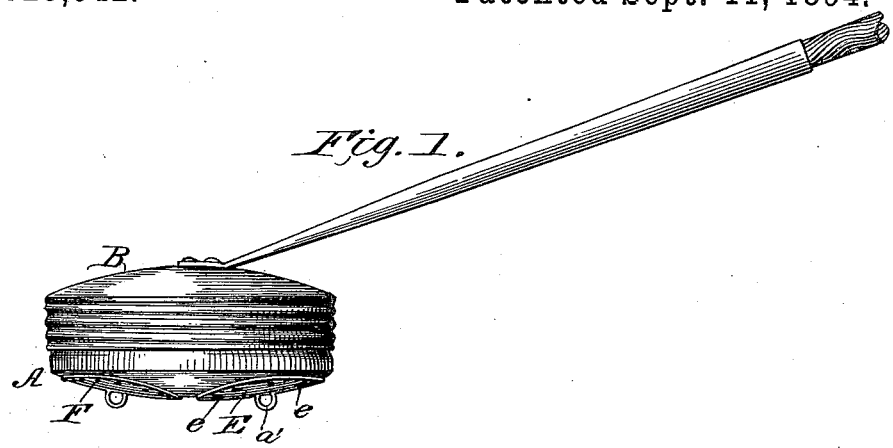
Figure 2:
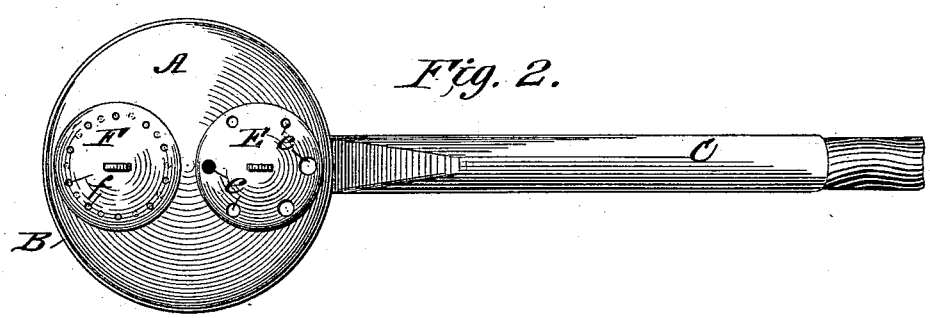
Figure 3:
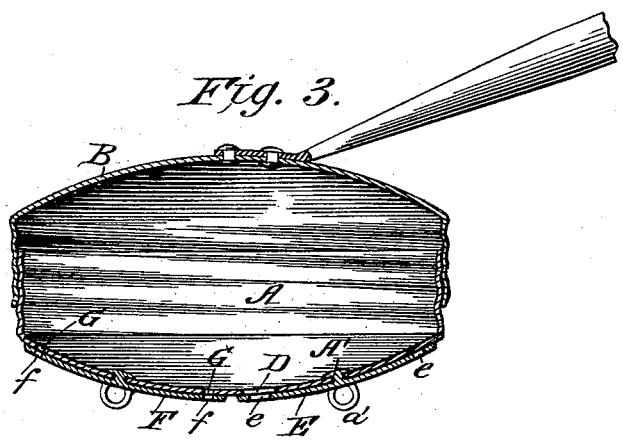

In the drawings—Figure 1 is a side view. Fig. 2 is an inverted plan view and Fig. 3 is a vertical section of my improved planter.

The planter is shown as formed with the cup A and the cover B threaded together and the cover being preferably provided with the handle C. At its outer end this handle C is hollow or socketed so it can receive the end of a long wooden handle when it is desired to operate the device with the body of the planter close to the ground or at a distance from the operator. This may be desirable in planting certain seeds when there is a strong wind and in dusting some of the poisonous insecticides as will be readily understood. The bottom of the cup A is preferably rounded as shown and is provided near to its center with an opening D usually made larger than the largest of the various sized openings of the dropping wheel presently described.

To the bottom I journal disks E and F which for convenience of reference I term respectively the dropping disk and the broadcast disk. The dropping disk E is provided with a series of openings $e$ varying in size ranging from a small opening of proper size to permit the discharge of mustard seed to an opening large enough for radish or lettuce seed. The disk may be adjusted to bring any one of its said openings in register with the opening D of the cup bottom so that the seed being sown will pass through said opening D and thence out of the opening $a$ of the disk. Any one of the said openings $a$ may be brought into register with the opening D to suit the particular seed employed, the disk being provided with a handle $a'$ preferably secured to the rivet A' to which the disk is secured and by which it is held to the bottom of the cup. It should be noticed that the dropping disk is curved correspondingly to and fits closely to the curved bottom of the cup. In the bottom I also form a series or number of openings G and the broadcast disk F has openings $f$ so arranged that they can be set into register with openings $f$ when it is desired to discharge the seed broadcast or dust insecticides such as paris green, london purple, &c., or out of such register when it is desired to shut off such discharge. This disk, like the disk E, is curved to correspond to the curvature of the cup bottom and has a handle secured to the rivet to which the disk is also secured and by which it is held to the cup bottom.

By the described construction any of the various sized garden seeds may be sown and the seed may be seen as it is dropped so that the operator can know at all times whether the device is operating.

It will be understood that in practice the seed are to be sifted through the holes by agitation, the sower being shaken horizontally over the furrow or trench to be seeded.

Having thus described my invention, what I claim as new, and desire to secure by Letters Patent, is—

1. A hand seed sower substantially as described comprising the cup having its bottom formed with the large opening and with the series of small openings, the disk having a series of graded openings movable consecutively into register with the said large opening and the disk having the series of openings movable into and out of register with the series of small openings in the cup bottom all substantially as and for the purposes set forth.

2. A hand seed sower comprising the cup, the top threaded to said cup such cup having a rounded bottom provided with a large opening and with a series of small openings, the dropping disk curved to correspond to said bottom and having a series of graded openings movable consecutively into register with the large opening of the cup bottom and the broadcast disk curved to correspond with the cup bottom and having a series of openings movable into and out of register with those of the cup bottom substantially as and for the purposes set forth.

3. The improved hand seed sower herein described consisting of the top, the handle secured to and extended from said top the cup screwed to said top and having the rounded bottom provided with the large opening and with the series of small openings, the dropping disk having the series of graded openings movable consecutively into register with the large opening of the cup bottom and the broadcast disk curved to correspond with the curvature of the cup bottom and having a series of openings movable into and out of register with the small openings of the cup bottom, the rivets to which said disks are secured and by which they are held to the cup bottom, and the handles secured to said rivets by which they and the disks may be turned all substantially as and for the purposes set forth.

WILLIAM REECE BOWEN.

Witnesses:
SAMUEL R. BOWEN,
M. I. COXE.